United States Patent
Kim et al.

(10) Patent No.: US 8,097,988 B2
(45) Date of Patent: Jan. 17, 2012

(54) HORIZONTAL LINEAR VIBRATOR

(75) Inventors: Yong Jin Kim, Gyunggi-do (KR); Jun Kun Choi, Gyunggi-do (KR); Jae Woo Jun, Gyunggi-do (KR); Ki Suk Woo, Seoul (KR); Kwang Hyung Lee, Gyunggi-do (KR); Je Hyun Bang, Gyunggi-do (KR); Seok Jun Park, Gyunggi-do (KR); Kyung Ho Lee, Gyunggi-do (KR); Hwa Young Oh, Seoul (KR)

(73) Assignee: Samsung Electro-Mechanics Co., Ltd., Gyunggi-Do (KR)

( * ) Notice: Subject to any disclaimer, the term of this patent is extended or adjusted under 35 U.S.C. 154(b) by 299 days.

(21) Appl. No.: 12/562,967

(22) Filed: Sep. 18, 2009

(65) Prior Publication Data

US 2011/0018365 A1     Jan. 27, 2011

(30) Foreign Application Priority Data

Jul. 22, 2009    (KR) ......................... 10-2009-0066870

(51) Int. Cl.
   *H02K 33/00*    (2006.01)
(52) U.S. Cl. ............................... 310/15; 310/17; 310/25
(58) Field of Classification Search ............... 310/12.04, 310/14, 17, 25, 29, 30, 36
   See application file for complete search history.

(56) References Cited

U.S. PATENT DOCUMENTS

| | | | | |
|---|---|---|---|---|
| 7,245,049 B2* | 7/2007 | Aihara | | 310/15 |
| 7,538,463 B2* | 5/2009 | Miura et al. | | 310/81 |
| 7,671,493 B2* | 3/2010 | Takashima et al. | | 310/15 |
| 7,911,098 B2* | 3/2011 | Lee et al. | | 310/81 |
| 7,960,875 B2* | 6/2011 | Higuchi | | 310/15 |
| 2004/0150277 A1* | 8/2004 | Moriyasu | | 310/81 |
| 2010/0045118 A1* | 2/2010 | Hamura et al. | | 310/17 |

* cited by examiner

*Primary Examiner* — Quyen Leung
*Assistant Examiner* — Naishadh Desai
(74) *Attorney, Agent, or Firm* — Blakely Sokoloff Taylor & Zafman LLP

(57) ABSTRACT

The present invention provides a horizontal linear vibrator which can reduce the thickness but increase the strength of vibrations while at the same time guaranteeing a sufficiently long lifetime and satisfactory responsivity. The horizontal linear vibrator includes a casing, a bracket, a vibration unit, a cylindrical coil and springs. The bracket is coupled to the casing to form an internal space. The vibration unit includes a weight, a pair of yokes and magnets. The weight has an opening therein. The yokes are disposed on the inner surfaces of the weight. The magnets are provided in the yokes such that different poles of the magnets face each other. The cylindrical coil is perpendicularly mounted to the bracket and disposed in space between the pair of yoke. The springs are coupled to both ends of the casing or the bracket. The springs elastically support the vibration unit to allow the vibration unit to vibrate in the horizontal direction.

13 Claims, 4 Drawing Sheets

HORIZONTAL LINEAR VIBRATOR

CROSS REFERENCE TO RELATED APPLICATION

This application claims the benefit of Korean Patent Application No. 10-2009-0066870, filed Jul. 22, 2009, entitled "HORIZONTAL LINEAR VIBRATOR", which is hereby incorporated by reference in its entirety into this application.

BACKGROUND OF THE INVENTION

1. Technical Field

The present invention relates to a horizontal linear vibrator.

2. Description of the Related Art

Generally, portable electronic devices, such as mobile phones, game players, mobile information terminals, etc., have various vibration generating units to prevent noise therefrom from disturbing other people. Particularly, such a vibration generating unit is installed in a cellular phone and used as a mute signal reception indicating unit. Recently, in accordance with the trend to provide a small and slim cellular phone, a reduction in the size and an increase in the function of a vibration generating unit installed in the cellular phone are also required.

At present, a vibration generating unit which is one of several signal reception indicating units used in a communication device, such as a cellular phone, converts electric energy into mechanical vibration by the use of a principle of generating electromagnetic force. That is, the vibration generating unit is used as a mute signal reception indicating unit in the cellular phone.

Meanwhile, a method in which mechanical vibration is generated by rotating a rotor having an eccentric weight has been used as a representative example of methods of operating vibration generating units according to conventional techniques. The rotation of the rotor is implemented by a commutator or brush motor structure which commutates currents through a contact point between the brush and the commutator and then supplies the currents to a coil of the rotor.

However, in the vibration generating unit having such a structure, when the brush passes through a gap between segments of the commutator, mechanical friction, electric sparks or abrasion is induced, thus creating impurities, such as black powder, thereby to reducing the lifetime of the vibration generating unit. A vertical linear vibrator was proposed to overcome these problems, and representative examples of which can produce reliable linear vibration.

FIG. 1 is a sectional view of a vertical linear vibrator according to a conventional art.

As shown in FIG. 1, the vertical linear vibrator 10 according to the conventional art includes a casing 20, a bracket 30, a vibration unit 40 and a spring 50. The casing 20 defines a space therein. The bracket 30 supports thereon a coil 32 which forms a magnetic field using an electric current applied to the coil 32. A damper 34 is provided on the bracket 30. The vibration unit 40 includes a yoke 42 which has a hollow space therein and is closed on one end thereof, a magnet 44 which is installed in the hollow space of the yoke 42 and provided with a plate yoke 43 attached to the lower surface thereof, and a weight 46 which is fitted over the circumferential surface of the yoke 42. The spring 50 is coupled to the upper surface of the casing 20 to elastically support the vibration unit 40 such that it linearly vibrates. The yoke 42 includes a disk part 42a and a rim part 42b which is bent downwards from the outer edge of the disk part 42a and extends a predetermined length.

In the vertical linear vibrator 10 having the above-mentioned construction, when power is applied to the coil 32, the vibration unit 40 vibrates upwards and downwards by the spring 50 due to interaction between a magnetic field which is generated by a magnetic circuit including the cylindrical magnet 44, the plate yoke 43 and the yoke 42, and an electric field generated by the coil 32.

However, in the vertical linear vibrator 10, because the vibration quantity is proportional to a value obtained by multiplying the weight of the vibration unit 40 by a displacement thereof, the weight or displacement of the vibration unit 40 must be increased to ensure sufficient vibration quantity. This induces a disadvantage of the vertical linear vibrator 10 being increased in thickness. Furthermore, this structure cannot conform to the trend of small and slim cellular phones.

SUMMARY OF THE INVENTION

The present invention has been made in an effort to provide a horizontal linear vibrator which can reduce the thickness but increase vibration strength while at the same time guaranteeing a sufficiently long lifetime and satisfactory responsivity.

In a horizontal linear vibrator according to an embodiment of the present invention, a casing is provided. A bracket is coupled to the lower end of the casing to form an internal space in the casing and the bracket. A vibration unit is provided. The vibration includes a weight, a pair of yokes and magnets. The weight has an opening formed such that upper and lower ends thereof are open. The yokes are disposed on the inner surfaces of the weight. The yokes are spaced apart from each other by a predetermined distance. The magnets are provided in the yokes such that different poles of the magnets face each other. A cylindrical coil is perpendicularly mounted to the upper surface of the bracket and disposed in space between the pair of yoke. The springs are coupled to both ends of the casing or the bracket. The springs elastically support the vibration unit to allow the vibration unit to vibrate in the horizontal direction.

In the horizontal linear vibrator, a damper may be provided on each of the both ends of the casing or the bracket to prevent the vibration unit from coming into direct contact with the casing or the bracket.

In the horizontal linear vibrator, a circuit board may be provided on an upper surface of the bracket.

Furthermore, a coil guide may be provided on the upper surface of the bracket, so that the cylindrical coil is supported by the coil guide.

The circuit board may have an opening through which the coil guide is disposed.

In addition, plates may be provided on both ends of the weight. The plates may fasten corresponding ends of the springs to the weight.

The yokes may comprise a first yoke and a second yoke. Each of the first and second yokes may have an opening on one side thereof. The first and second yokes may be respectively disposed on the inner surfaces of the longitudinal side plates of the weight such that the openings thereof face each other.

Each of the yokes may include a vertical plate, an upper plate and a lower plate. The vertical plate may be coupled to the inner surface of the longitudinal side plate of the weight. The upper plate may be bent inwards from the upper end of the vertical plate. The lower plate may be bent inwards from the lower end of the vertical plate.

The magnet provided in each of the yokes may comprise a plurality of magnets arranged such that different poles thereof are disposed on a same plane.

The cylindrical coil may be mounted to the bracket such that the center axis thereof is perpendicular to a horizontal direction of the vibration unit.

Each of the springs may comprise a coil spring or a plate spring.

Furthermore, a magnetic flux flowing between the magnet disposed in the first yoke and the magnet disposed in the second yoke may be perpendicular to currents flowing in the cylindrical coil.

In addition, magnetic fluid may be applied to the magnets or the springs.

BRIEF DESCRIPTION OF THE DRAWINGS

The above and other objects, features and advantages of the present invention will be more clearly understood from the following detailed description taken in conjunction with the accompanying drawings, in which.

DESCRIPTION OF THE PREFERRED EMBODIMENTS

Figure 1:
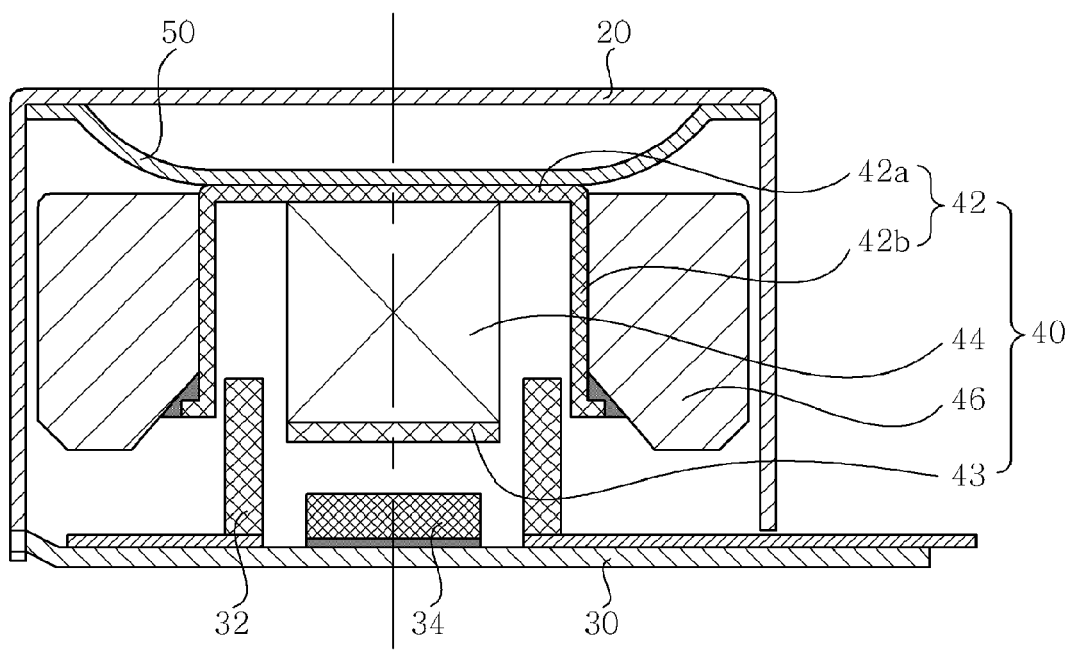
FIG. 1 is a sectional view showing a linear vibrator, according to a conventional art.

Reference now should be made to the drawings, in which the same reference numerals are used throughout the different drawings to designate the same or similar components. In the following description, when it is determined that the detailed description of the conventional function and conventional structure would confuse the gist of the present invention, such a description may be omitted. Furthermore, the terms and words used in the specification and claims are not necessarily limited to typical or dictionary meanings, but must be understood to indicate concepts selected by the inventor as the best method of illustrating the present invention, and must be interpreted as having meanings and concepts adapted to the scope and sprit of the present invention for understanding the technology of the present invention.

Hereinafter, an embodiment of the present invention will be described in detail to with reference to the attached drawings.

Figure 2:
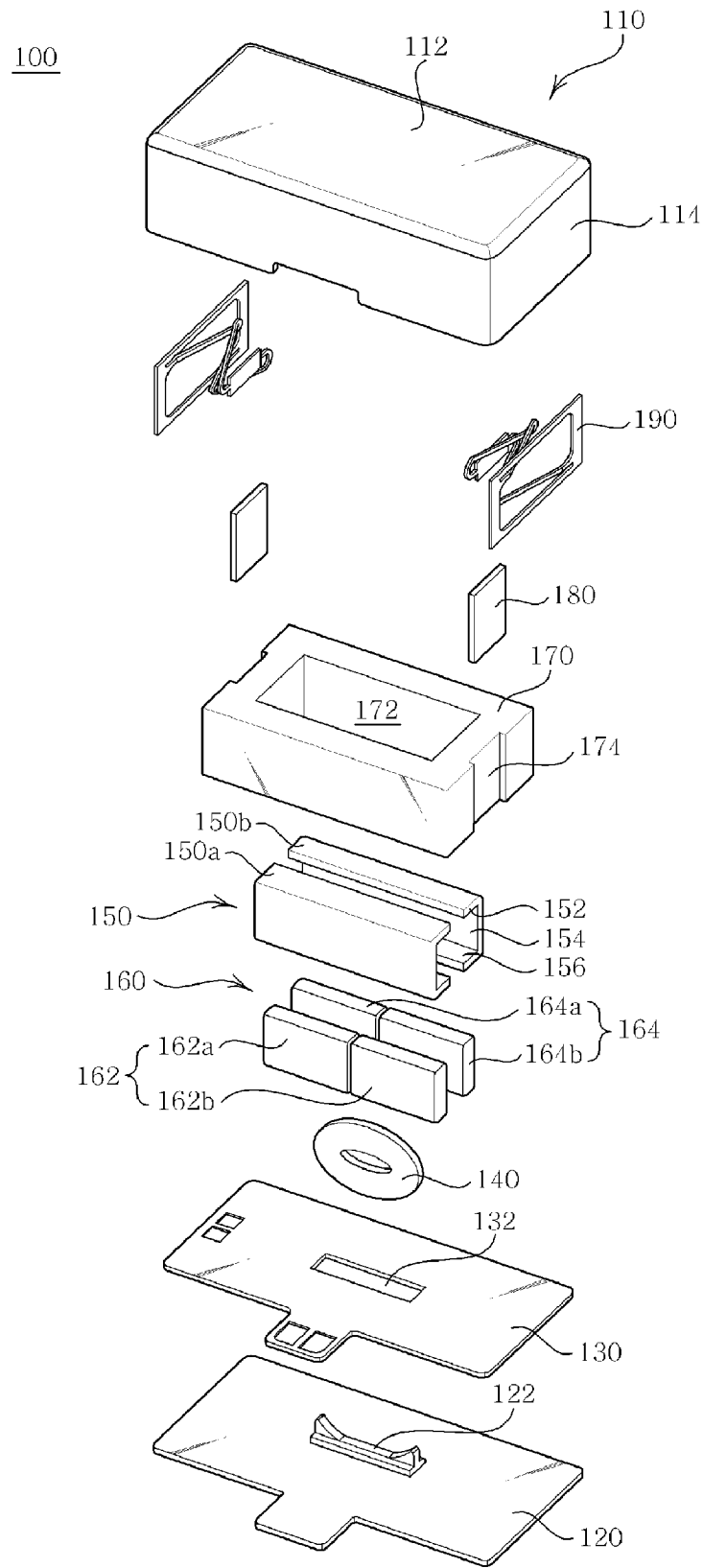
FIG. 2 is an exploded perspective view of a horizontal linear vibrator, according to an embodiment of the present invention.
Figure 3:
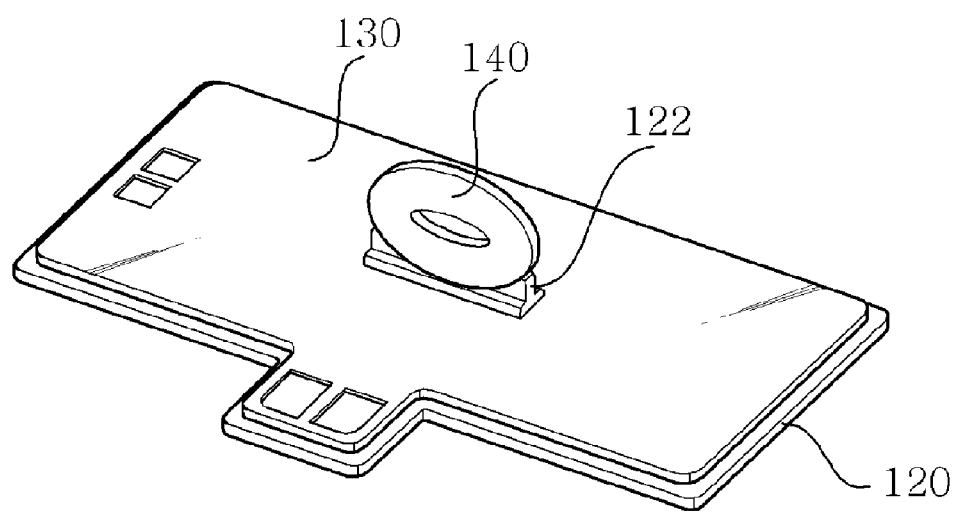
FIG. 3 is an assembled perspective view showing a bracket, a circuit board and a cylindrical coil according to the embodiment of the present invention.
Figure 4:
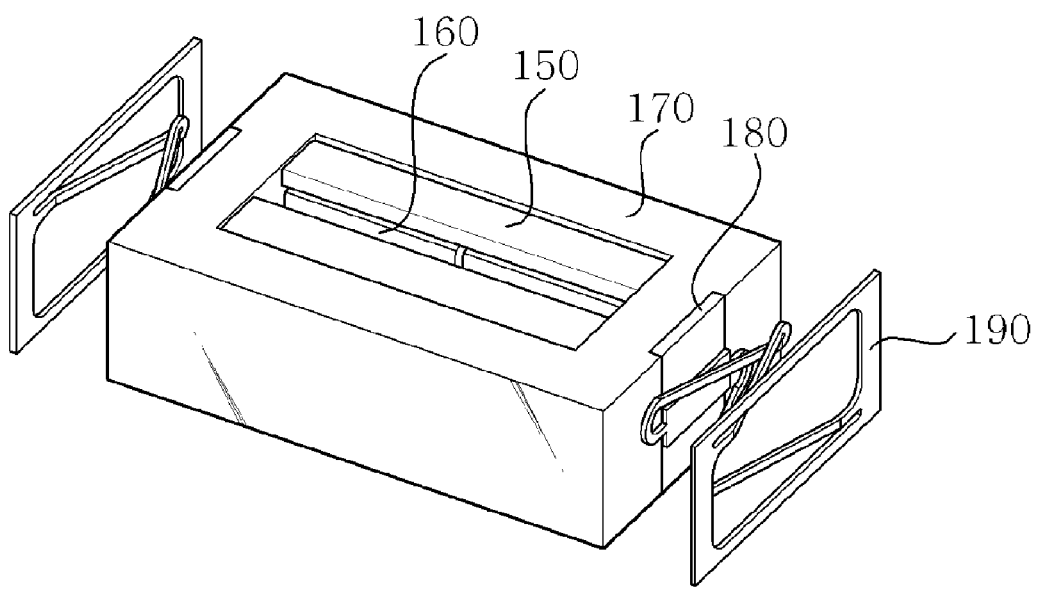
FIG. 4 is an assembled perspective view showing a vibration unit and springs according to the embodiment of the present invention.
Figure 5:
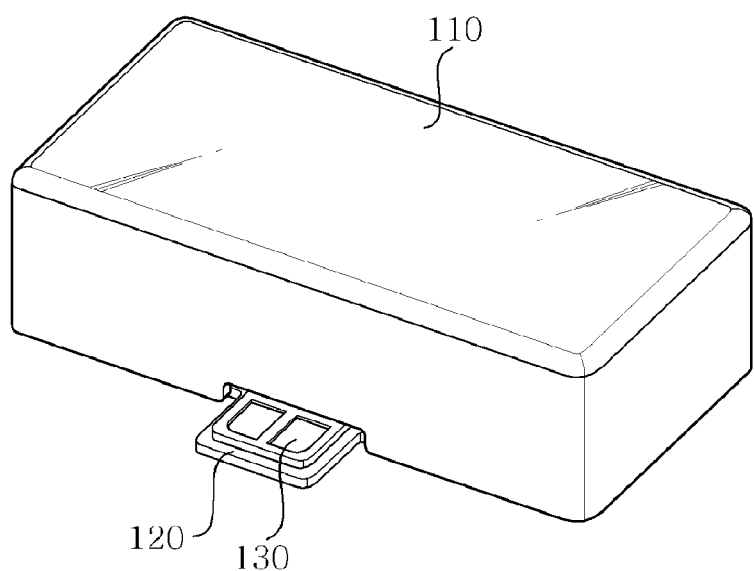
FIG. 5 is a perspective view of the assembled horizontal linear vibrator according to the embodiment of the present invention.

FIG. 2 is an exploded perspective view of a horizontal linear vibrator 100, according to an embodiment of the present invention. FIG. 3 is an assembled perspective view showing a bracket 120, a circuit board 130 and a cylindrical coil 140 according to the embodiment of the present invention. FIG. 4 is an assembled perspective view showing a vibration unit and springs 190 according to the embodiment of the present invention. FIG. 5 is a perspective view of the assembled horizontal linear vibrator 100 according to the embodiment of the present invention. The horizontal linear vibrator 100 according to the embodiment will be described in detail with reference to these drawings.

As shown in FIGS. 2 through 5, the horizontal linear vibrator 100 of the present invention includes a casing 110, the bracket 120, the vibration unit and the springs 190.

The casing 110 protects the horizontal linear vibrator 100 from the outside and provides space for the vibration unit to be displaced and to vibrate in the horizontal direction. That is, the casing 110 is a member providing an internal space for the horizontal linear vibrator 100. In detail, the internal space is defined by the assembly of the casing 110 and the bracket 120.

The casing 110 may have any structure, so long as it forms an internal space when it is assembled with the bracket 120. Preferably, the casing 110 has a rectangular structure whose longitudinal length (the direction in which the vibration unit horizontally vibrates) is longer than that in the lateral direction, so that the horizontal displacement space of the vibration unit can be sufficiently guaranteed.

In this embodiment, the casing 110 includes an upper plate 112 and sidewall plates 114 which are bent perpendicularly down from the edges of the upper plate 114. The sidewall plates 114 include longitudinal side plates which extend in the longitudinal direction of the casing 110, and lateral side plates which extend in the lateral direction of the casing 110.

Here, a damper (not shown) may be provided on the sidewall plate 114 of the casing 110 to absorb shock applied to the vibration unit and prevent the vibration unit from coming into direct contact with the casing 110 when the vibration unit horizontally vibrates. A variety of materials which are capable of absorbing shocks, such as rubber, polypropylene, etc., can be used as the material for the damper.

The bracket 120 is coupled to the lower end of the casing 110 to define the internal space. Furthermore, the bracket 120 provides space for mounting the circuit board 130 and the cylindrical coil 140.

In detail, the bracket 120 has a planar shape and covers the open lower end of the casing 110. However, the configuration of the casing 110 and the bracket 120 shown in FIG. 2 is only one example of the structure in which the casing 110 may be assembled with the bracket 120 to form the internal space in which the vibration unit vibrates. For example, alternatively, the casing 110 and the bracket 120 may be configured such that the casing 110 has a planar shape while the bracket 120 has a rectangular box shape which is open on the upper end thereof. As well, those skilled in this art will easily understand that the configuration of the casing 110 and the bracket 120 can be variously modified.

A coil guide 122 which supports the cylindrical coil 140 in the vertical direction is provided on the upper surface of the bracket 120. For example, the coil guide 122 may be configured such that it has a concave seating surface which is in contact with a curved portion of the cylindrical coil 140. In FIG. 2, although the coil guide 122 has been illustrated as being provided on the bracket 120 and the circuit board 130 has been illustrated as having an opening through the coil guide 122, the coil guide 122 may be provided on the circuit board 130. This should also fall within the bounds of the present invention. As well, in the drawings, although the coil guide 122 has been illustrated as being configured such that it protrudes from the upper surface of the bracket 120, the coil to guide 122 may comprise a depression which is formed in the bracket 120 so that the cylindrical coil 140 is inserted into and supported by the depression.

The circuit board 130 having a pattern thereon is provided on the upper surface of the bracket 120 (refer to FIG. 4). The circuit board 130 is connected to an external input terminal to transmit power to the cylindrical coil 140. In the embodiment, the circuit board 130 has therein the opening 132 through which the coil guide 122 provided on the bracket 120 to support the cylindrical coil 140 is disposed. In FIG. 2, although the circuit board 130 has been illustrated as being provided separately from the bracket 120, they may be integrally formed into a single body made of the same material. This can also fall within the bounds of the present invention.

The cylindrical coil 140 is provided on the upper surface of the bracket 120. The cylindrical coil 140 generates an electric field of a predetermined intensity when external power is applied thereto.

In detail, the cylindrical coil 140 which generates an electric field is vertically placed on the upper surface of the bracket 120. In other words, the cylindrical coil 140 is disposed on the upper surface of the bracket 120 such that the center axis thereof is oriented in the lateral direction of the bracket 120. Furthermore, the cylindrical coil 140 is disposed in space defined between a first magnet 162 and a second magnet 164. Magnetic flux formed between the first magnet 162 and the second magnet 164 is perpendicular to the direction in which currents flow through the cylindrical coil 140, thus forming a closed magnetic circuit. Thereby, the vibration unit can vibrate in the horizontal direction. The operation of the vibration unit will be explained in more detail in the description of FIG. 6.

The vibration unit which linearly vibrates in the horizontal direction includes the yoke 150, a magnet 160 and a weight 170.

The yoke 150 functions to optimize the magnetic flux generated from the magnet 160 that is disposed in the yoke 150. In this embodiment, the yoke 150 comprises two to yokes 150a and 150b which face each other and are spaced apart from each other by a predetermined distance to form space for receiving the cylindrical coil 140 therebetween.

In detail, the first yoke 150a and the second yoke 150b are configured such that the space for receiving a magnet 160 is defined between the first yoke 150a and the second yoke 150b. For example, each of the first and second yokes 150a and 150b has a "⊏" shape. Here, each of the first and second yokes 150a and 150b includes a vertical plate 154, an upper plate 152 which is perpendicularly bent from the upper end of the vertical plate 154, and a bottom plate 156 which is perpendicularly bent from the lower end of the vertical plate 154 and is parallel to the upper plate 152.

The first and second yokes 150a and 150b are disposed on the inner surfaces of the longitudinal side plates of the weight 170, preferably, in the longitudinal direction, such that open ends of the first and second yokes 150a and 150b face each other.

The yoke 150 having the above-mentioned configuration reduces leakage flux of the magnet 160 disposed in the yoke 150. This prevents generation of attractive force between the magnet 160 and the bracket 120 that causes sag of the vibration unit. In addition, this increases the range of selection of material for the bracket 120. Furthermore, the yoke 150 is made of material having magnetic permeability capable of forming a magnetic path and surrounds the magnet 160. Hence, the yoke 150 focuses the magnetic flux which interacts with the cylindrical coil 140 on a predetermined portion, thus increasing magnetic flux which is linked with the cylindrical coil 140, thereby enhancing the efficiency of the horizontal linear vibrator.

The magnet 160 generates a magnetic field of a predetermined magnitude and thus forms a magnetic circuit which horizontally vibrates the vibration unit using reciprocal action between the vibration unit and the cylindrical coil 140.

The magnet 160 is disposed in the yoke 150. A magnetic fluid may be applied to the outer surface of the magnet 160.

In this embodiment, the magnet 160 comprises a first magnet 162 which is disposed in the first yoke 150a, and a second magnet 164 which is disposed in the second yoke 150b. Each of the first and second magnets 162 and 164 is attached to the inner surface of the vertical plate 154 of the corresponding yoke 150 and is disposed between the upper plate 152 and the bottom plate 156 of the yoke 150. Furthermore, it is preferable that each of the first and second magnets 162 and 164 comprise a plurality of magnets which are arranged such that a relatively large horizontal displacement can be obtained without increasing the thickness. In this case, to increase magnetic force which links with the cylindrical coil 140, the magnets 160 are disposed such that different poles thereof are placed on the same plane. This will be explained in more detail in the description of FIG. 6 which illustrates the operating principle of the horizontal linear vibrator of the present invention.

The weight 170 functions to apply a predetermined weight to the vibration unit to generate sufficient vibrational force. The yoke 150 is inserted into the weight 170.

In detail, the weight 170 has therein an opening 172 which opens the upper and lower ends of the weight 170 and forms an internal space for containing the yoke 150 and the cylindrical coil 140 therein. The first yoke 150a and the second yoke 150b are disposed on the inner surfaces of the longitudinal side plates of the weight 170 such that the first yoke 150a and the second yoke 150b face each other. The cylindrical coil 140 is vertically placed in the space between the first yoke 150a and the second yoke 150b.

Here, ends of the springs 190 are coupled to the side plate of the weight 170. In the embodiment, plates 180 are provided on the end plates of the weight 170 to facilitate the coupling of the springs 190 to the weight 170. In detail, guide depressions 174 are respectively formed in the end plates of the weight 170. The plates 180 are respectively inserted into the guide depressions 174. Each plate 180 is fastened to the inner end of the corresponding spring 190.

The springs 190 elastically support (provide elastic restoring force to) the vibration to unit such that the vibration unit linearly vibrates. The springs 190 are coupled at the inner ends thereof to the vibration unit and coupled at the outer ends thereof to the side plates of the casing 110.

A plate spring or a coil spring can be used as each spring 190. Preferably, the springs 190 are provided on both ends of the vibration unit to have a symmetrical structure.

Meanwhile, it is preferable that magnetic fluid (not shown) is applied to the springs 190 as damping means. Because the magnet fluid is characterized in that it is collected by magnetic flux of the magnets 160, the magnet fluid is applied to the springs 190 and is maintained in this state by the leakage flux of the magnets 160. Thus, when the vibration unit horizontally vibrates, the magnetic fluid prevents the vibration unit from coming into direct contact with the casing 110, thereby preventing contact shock and noise.

Here, the magnetic fluid is formed in such a way that magnetic powder is stably and evenly dispersed in liquid to have a colloidal shape and a surface active agent is added to the liquid to prevent deposition or agglutination of the magnetic powder attributable to gravity or the magnetic field. For example, magnetic fluid formed by dispersing triiron tetroxide or iron-cobalt alloy particles in oil or water is used, and, recently, magnetic fluid formed by dispersing cobalt in toluene is being used. Such magnetic powder is an ultrafine particle powder ranging from 0.01 μm to 0.02 μm and moves under Brownian motion that is one of the specific characteristics of ultrafine particles. In addition, the magnetic fluid is characterized in that even if an external magnetic field, gravity, centrifugal force, etc. is applied thereto, the density of magnetic powder particles in the fluid remains constant.

Figure 6:
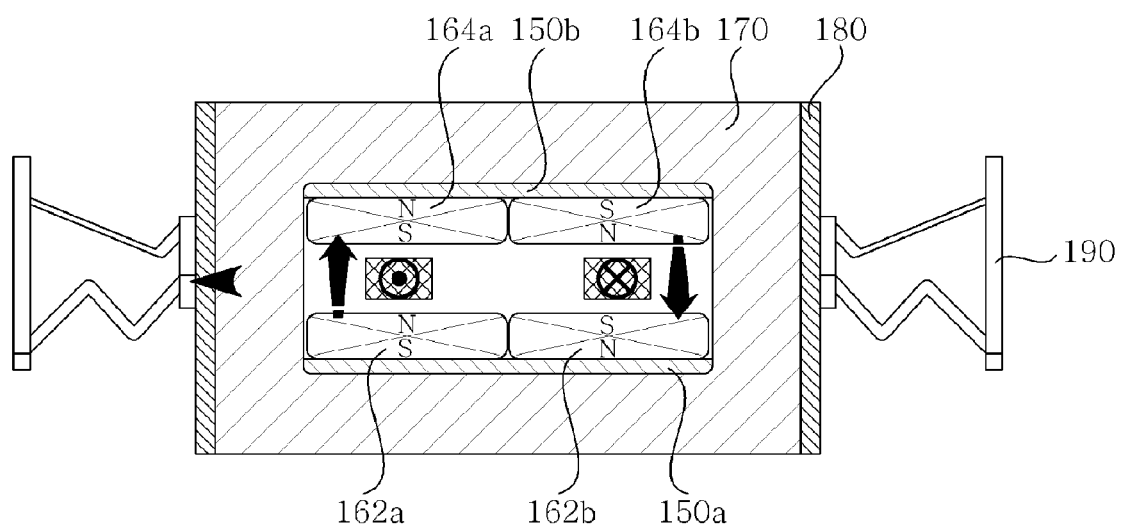
FIG. 6 is a view illustrating the principle of operation of the horizontal linear vibrator according to the embodiment of the present invention.

FIG. 6 is a view illustrating the principle of the operation of the horizontal linear vibrator 100 according to the embodiment of the present invention. Although FIG. 6 shows one example for illustrating the principle of the operation of the horizontal linear to vibrator 100, the present invention is not limited to this example. The principle of the operation of the horizontal linear vibrator 100 according to the embodiment of the present invention will be explained with reference to FIG. 6.

As shown in FIG. 6, the first magnets 162 which include the left first magnet 162a and the right first magnet 162b that are arranged such that different poles thereof are disposed on the same plane are attached to the inner surface of the first yoke 150a. The second magnets 164 which include the left second magnet 164a and the right second magnet 164b that are arranged such that different poles thereof are disposed on the same plane are attached to the inner surface of the second yoke 150b. Here, when the first magnet 162 and the second magnet 164 are disposed such that the poles thereof are oriented as expressed in the drawings, magnetic flux flowing upwards (based on the drawing) is formed between the left first magnet 162a and the left second magnet 164a, and magnetic flux flowing downwards (based on the drawing) is formed between the right first magnet 162b and the right second magnet 164b. In the case where current flows through the cylindrical coil 140 between the left first magnet 162a and the left second magnet 164a in the direction in which it flows out from the surface of the drawing, force is applied to the vibration unit to the left by Fleming's left hand rule. Simultaneously, current flows through the cylindrical coil 140 between the right first magnet 162b and the right second magnet 164b in the direction in which it enters the surface of the drawing, so that force is also applied to the vibration unit to the left by Fleming's left hand rule.

Thereby, the vibration unit which is elastically supported by the springs 190 vibrates in the horizontal direction. Furthermore, the direction of force applied to the vibration unit may be varied by changing the directions of the magnetic poles of the first and second magnets 162 and 164 or the direction in which current flows through the cylindrical coil 140. This modification should be regarded as falling within the bounds of the above principle of the operation of the horizontal linear vibrator.

As described above, in a horizontal linear vibrator according to the present invention, a vibration unit vibrates in the horizontal direction. Therefore, the present invention does not require space for vertical motion displacement of the vibration unit, thus reducing the thickness of the horizontal linear vibrator.

Furthermore, the present invention is designed such that the horizontal linear vibrator extends a predetermined length in the horizontal direction which is the direction in which the vibration unit vibrates. Hence, sufficient vibrational displacement of the vibration unit can be ensured in the horizontal direction, thus increasing the quantity of vibration.

In addition, a yoke which contains a magnet therein forms a magnetic path of a magnet and prevents leakage of magnetic flux. Therefore, the vibration unit can be prevented from being undesirably biased to one side by magnetic attractive force between the magnet and a bracket.

Moreover, a plurality of magnets is provided such that large displacement space is formed in the horizontal direction in which the vibration unit vibrates. Thus, magnetic force can be increased without increasing the thickness, thereby increasing the quantity of vibration.

Although the embodiment of the present invention has been disclosed for illustrative purposes, it will be appreciated that a horizontal linear vibrator according to the invention is not limited thereby, and those skilled in the art will appreciate that various modifications, additions and substitutions are possible, without departing from the scope and spirit of the invention.

Accordingly, any and all modifications, variations or equivalent arrangements should be considered to be within the scope of the invention, and the detailed scope of the invention will be disclosed by the accompanying claims.

What is claimed is:

1. A horizontal linear vibrator, comprising:
   a casing;
   a bracket coupled to a lower end of the casing to form an internal space in the casing and the bracket;
   a vibration unit comprising: a weight having an opening formed such that upper and lower ends thereof are open; a pair of yokes disposed on inner surfaces the weight, the yokes being spaced apart from each other by a predetermined distance; and magnets provided in the yokes such that different poles of the magnets face each other;
   a cylindrical coil perpendicularly mounted to an upper surface of the bracket and disposed in space between the pair of yokes;
   springs coupled to both ends of the casing or the bracket, the springs elastically supporting the vibration unit to allow the vibration unit to vibrate in the horizontal direction.

2. The horizontal linear vibrator as set forth in claim 1, further comprising:
   a damper provided on each of the both ends of the casing or the bracket to prevent the vibration unit from coming into direct contact with the casing or the bracket.

3. The horizontal linear vibrator as set forth in claim 1, further comprising:
   a circuit board provided on an upper surface of the bracket.

4. The horizontal linear vibrator as set forth in claim 1, wherein a coil guide is provided on the upper surface of the bracket, so that the cylindrical coil is supported by the coil guide.

5. The horizontal linear vibrator as set forth in claim 4, wherein the circuit board has an opening through which the coil guide is disposed.

6. The horizontal linear vibrator as set forth in claim 1, wherein plates are provided on both ends of the weight, the plates fastening corresponding ends of the springs to the weight.

7. The horizontal linear vibrator as set forth in claim 1, wherein the yokes comprise a first yoke and a second yoke, each of the first and second yokes having an opening on one side thereof, the first and second yokes being respectively disposed on the inner surfaces of the longitudinal side plates of the weight such that the openings thereof face each other.

8. The horizontal linear vibrator as set forth in claim 1, wherein each of the yokes comprise:
   a vertical plate coupled to the inner surface of the longitudinal side plate of the weight;
   an upper plate bent inwards from an upper end of the vertical plate; and
   a lower plate bent inwards from a lower end of the vertical plate.

9. The horizontal linear vibrator as set forth in claim 1, wherein the magnet provided in each of the yokes comprises a plurality of magnets arranged such that different poles thereof are disposed on a same plane.

10. The horizontal linear vibrator as set forth in claim 1, wherein the cylindrical coil is mounted to the bracket such that a center axis thereof is perpendicular to a horizontal direction of the vibration unit.

11. The horizontal linear vibrator as set forth in claim 1, wherein each of the springs comprises a coil spring or a plate spring.

12. The horizontal linear vibrator as set forth in claim 1, wherein a magnetic flux flowing between the magnet disposed in the first yoke and the magnet disposed in the second yoke is perpendicular to currents flowing in the cylindrical coil.

13. The horizontal linear vibrator as set forth in claim 1, wherein magnetic fluid is applied to the magnets or the springs.

* * * * *